United States Patent [19]
Gabrielyan

[11] Patent Number: 5,816,082
[45] Date of Patent: Oct. 6, 1998

[54] UNIVERSAL VEHICULAR ANTI-THEFT DEVICE

[76] Inventor: Mher Gabrielyan, 5726 Cleon Ave., North Hollywood, Calif. 91601

[21] Appl. No.: 660,543

[22] Filed: Jun. 7, 1996

[51] Int. Cl.[6] .................................................. B60R 25/02
[52] U.S. Cl. ................................ 70/209; 70/226; 70/227; 70/237
[58] Field of Search .............................. 70/209, 211, 212, 70/225–227, 237, 238, 259, 260

[56] References Cited

U.S. PATENT DOCUMENTS

| | | | |
|---|---|---|---|
| 5,275,030 | 1/1994 | Cole | 70/209 |
| 5,353,614 | 10/1994 | Anderson | 70/209 |
| 5,415,018 | 5/1995 | Ferrante | 70/209 |
| 5,537,847 | 7/1996 | Dalton et al. | 70/209 |
| 5,595,078 | 1/1997 | Harrell | 70/226 |
| 5,605,603 | 2/1997 | Taurog | 70/226 |

*Primary Examiner*—Steven N. Meyers
*Assistant Examiner*—Tuyet-Phuong Pham
*Attorney, Agent, or Firm*—Frank L. Zugelter

[57] ABSTRACT

An anti-theft device (18) mounted to a wheel (90) or the like. Device (18) includes a shield (20) that mounts on top of a wheel (90), with adjustable links (63, 64) at one end (27) of device (18) thrust through voids (91) separating spokes (92) of the wheel (90), and with swingable elbow members (55, 56) at the other end (38) of device (16) thrust through steering wheel voids (91). Legs (58) on the elbow members (55, 56) swing into clasping or yoke members (70), after which a locking bar assembly (80) mounts to the yoke members (70) and by which the device (18) is placed in a locked mode on the wheel (90). The elbow members (55, 56) include arms (57) which, along with the links (63, 64), are adjustable to provide change in depth to the device (18). The shield (20) includes a pair of panels (21, 22) that are slidably engageable with each other, with a fastener (28) and holes (23) in one of the panels that fixes the two together in one of a number of different lengths for the device (18). Limbs (41, 42) extending from the device's one end (38) mount to sleeves (47) on side edges (45) of the panel extending from the device's other end (27), to assist in assembling of the device (18) heads (49) on the limbs (41, 42) preventing disassembly of the device (18).

60 Claims, 3 Drawing Sheets

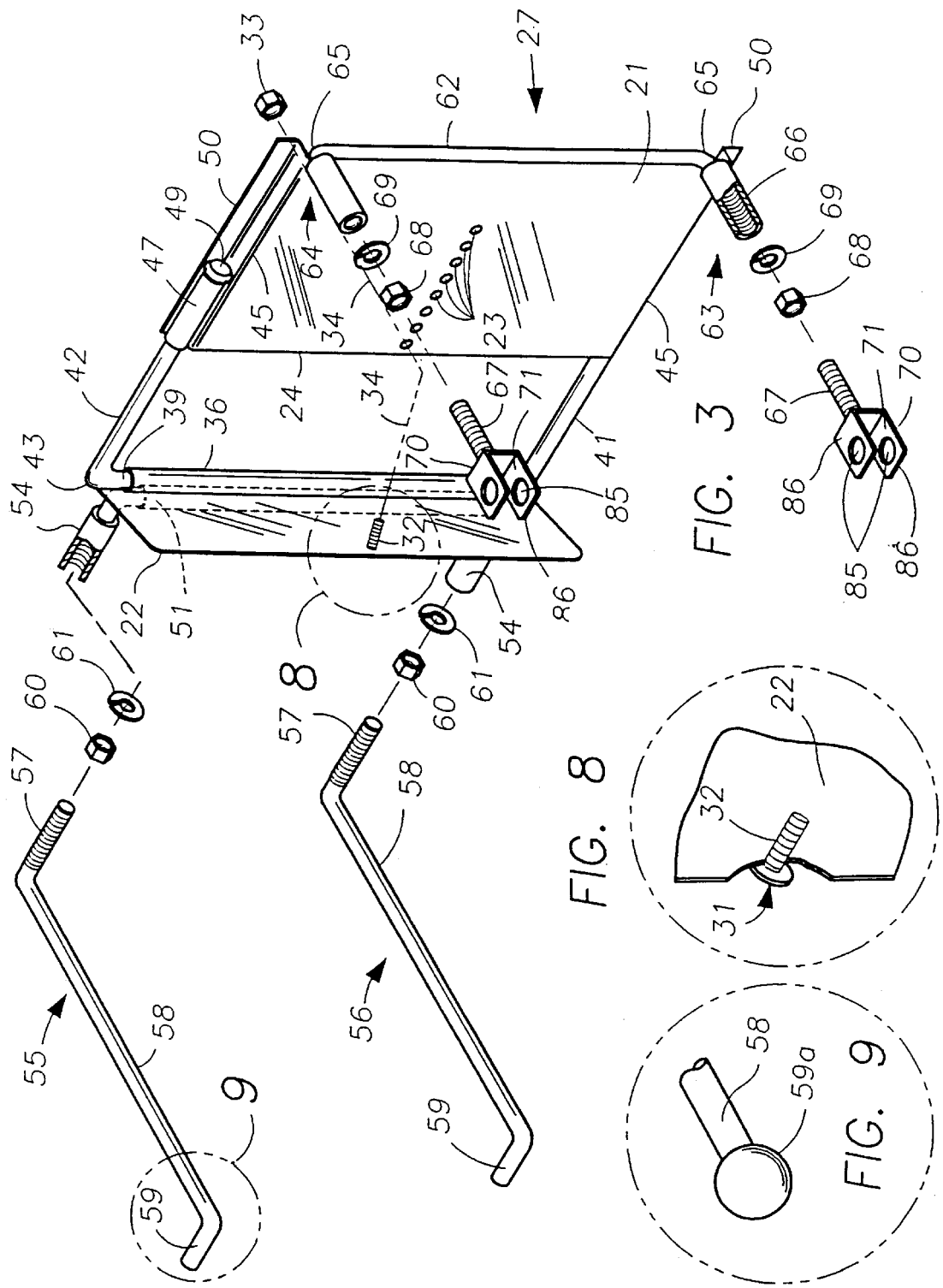

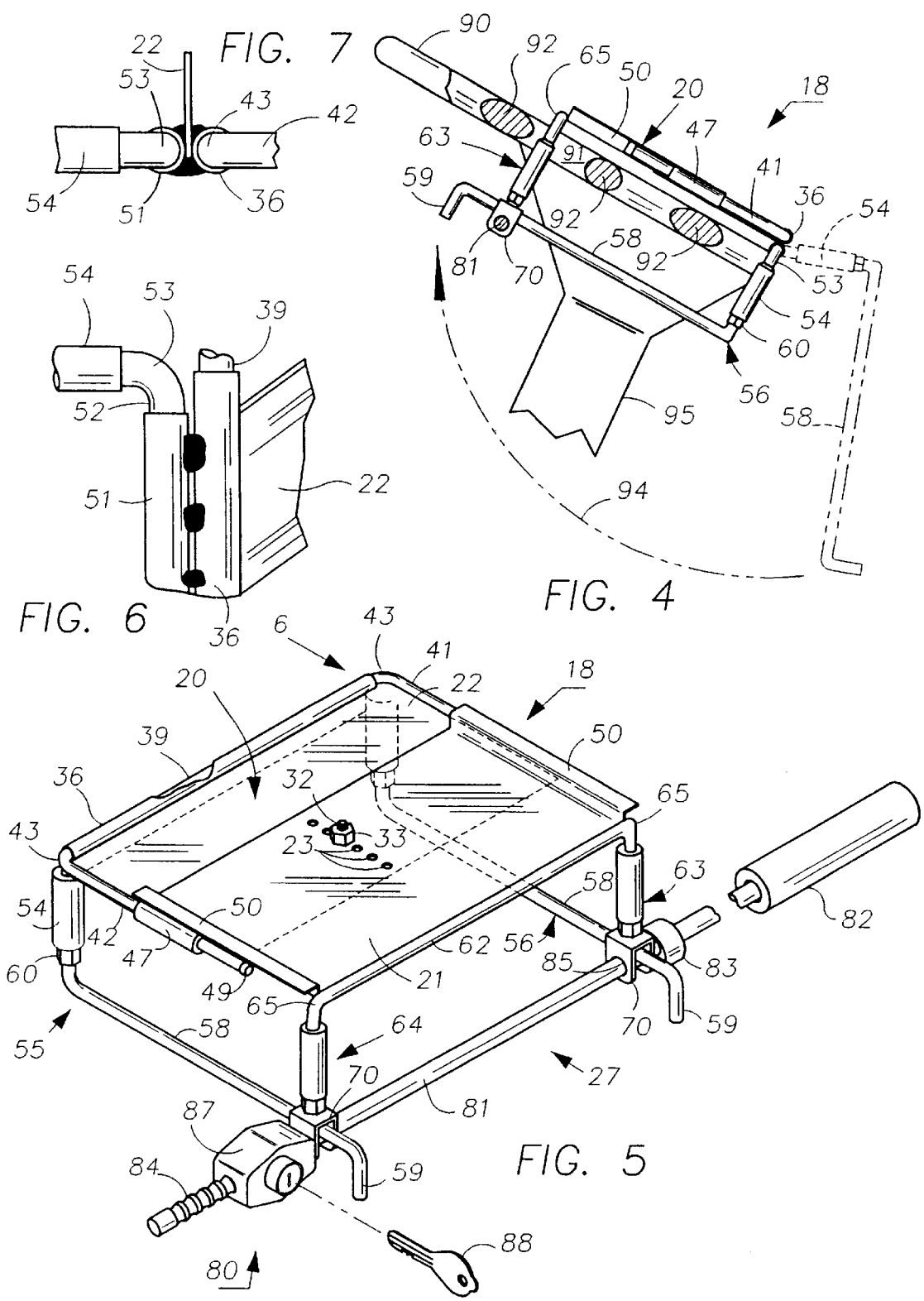

5,816,082

UNIVERSAL VEHICULAR ANTI-THEFT DEVICE

TECHNICAL FIELD

This invention is in an improvement of my device disclosed and claimed in my co-pending application, Ser. No. 08/537,358, filed Oct. 2, 1995, entitled STEERING WHEEL LOCK DEVICE, and is directed in particular to a device that prevents the unauthorized taking of a vehicle, particularly, a roadway vehicle, although not limited to roadway or other kinds of vehicles.

SUMMARY OF THE INVENTION

In this improved device, the shield that encompasses the top of a steering wheel now is composed of a pair of panels slidably engaging one another whereby the length of the device is adjustable, to adapt it in a full manner atop any sized steering wheel and its enclosed airbag housing should there be one. It further includes means for adjusting the depth of the device so as to adapt it to suitably mount to any one of a universal number of steering wheels having an innumerable variety of column configurations, sizes or lengths that are prevalent in today's plethora of models and designs in vehicles. There also is ready and easy assembly of the panels by reason of limbs extending from the one end of the device to slidingly reciprocate in sleeves mounted to one of the panels extending from an opposing end or termination of the device.

At one end of one of the panels of the shield, at a termination for the device, a support in the form of a tube for a mount is securely attached thereto. The limbs are connected to the mount at its portions that project from the tube and then extend toward and along corresponding side edges of the panel extending from the opposing end of the device, making for a U-shaped appearance for the mount and Limbs. Sleeves are mounted to and along such panel's side edges and into which the limbs slidably fit and reciprocate therein. Heads are mounted on the ends of the limbs to prevent their pulling out completely from their sleeves once the panels are assembled to one another.

A second support, again preferably tubular in nature, is securely mounted at the device's end at which the first-mentioned support is mounted, with a second mount therewithin. A pair of elbow members are connected to corresponding exposed turned portions of the second mount, outside of the second support. Each of the elbow members includes an arm that is adjustable in its length to provide change in the depth of the device. Legs are mounted to or extend from such arms, being disposed generally parallel to the side edges of both panels when the device is in a closed or locked mode.

Securely mounted to and at the other termination of the device, on the end of the panel carrying the sleeves, a support, such as a rod, is mounted. The rod includes turned portions thereon, to which links adjustable in their lengths are connected. The adjustability in length of the links contributes with the adjustability of the length of the arms of the elbow members to provide a desired depth for the device when applied to a particular steering wheel. These links are disposed in generally parallel fashion to that of the arms of the elbow members when the device is in a closed or locked mode. Yoke members are mounted on the distal ends of threaded pegs that thread to these links, for clasping the legs of the elbow members. A locking bar traverses the clasping or yoke members after insertion of such legs into cavities provided in the yoke members, with a stop along its length for engaging the one yoke member, and with fluted surfaces elsewhere along its length for cooperating with a locking mechanism mounted on the bar, and which locks the device in its closed mode. Feet are mounted on the portions of the legs which project past the cavities of the yokes, to prevent such legs from being forcibly withdrawn therefrom.

The shield's panel s are adjustable one to the other thereby changing the length of the device between its ends or terminations, by reason of the reciprocating motion available to the legs in and with their sleeves. A fastener secures the panels together through one hole of a series of holes in the panels, fastening them together in fixed manner.

An object of this invention is to provide a novel anti-theft device and improvement thereof for vehicles.

Another object of this invention is to provide a convenient anti-theft device readily and universally applicable to an innumerable number of vehicular steering wheels and their columns.

A further object of this invention is to provide an accommodation to the greatest number of designed and sized steering wheels with an anti-locking device applicable to any one of them.

A still further object of the invention is to provide an economical device that would be acceptable as an efficacious deterrent to the unauthorized taking of a vehicle.

Another object of the invention is to provide ease of assembly of the device by its user on a particular steering wheel, which assembly thereafter need not be changed unless used on a different vehicle's wheel and column.

These and other objects and advantages will become more apparent by a full and complete reading of the following description, the appended claims thereto and the accompanying drawing comprising three (3) sheets of nine (9) FIGURES.

BRIEF DESCRIPTION OF THE DRAWING

FIG. 3 is an exploded perspective view of the device illustrated in FIGS. 1 and 2, absent the steering wheel and locking mechanism assembly, with its panels subject to being in their extreme positions relative to one another were they to be closed one to the other.

FIG. 4 is a side view, partly in section, of the subject matter of the invention, and as applied to a steering wheel.

FIG. 5 is a perspective view, partly cut-away, of the subject matter of the invention, in its locked mode, absent a steering wheel.

FIG. 6 is a fragmentary view taken in the direction of the arrow 6 shown in FIG. 5, with the device in FIG. 5 rotated 90° counter-clockwise into the drawing sheet).

FIG. 7 is a view taken from the top of FIG. 6.

FIG. 8 is an enlarged view of a portion of FIG. 3 shown embraced by a phantom circle.

FIG. 9 is an enlarged view of another portion of FIG. 3 shown embraced by a phantom circle.

PREFERRED MODE OF CARRYING OUT THE INVENTION

Figure 1:
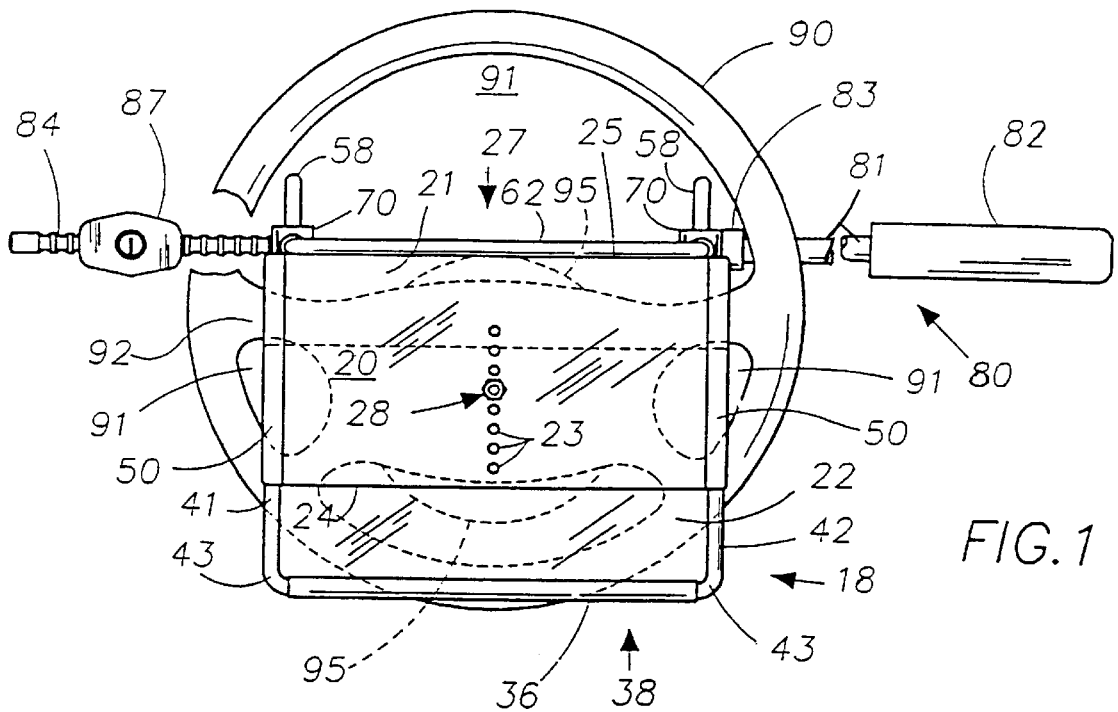
FIG. 1 is a plan view of the device of the invention, mounted on a steering wheel of a vehicle.
Figure 2:
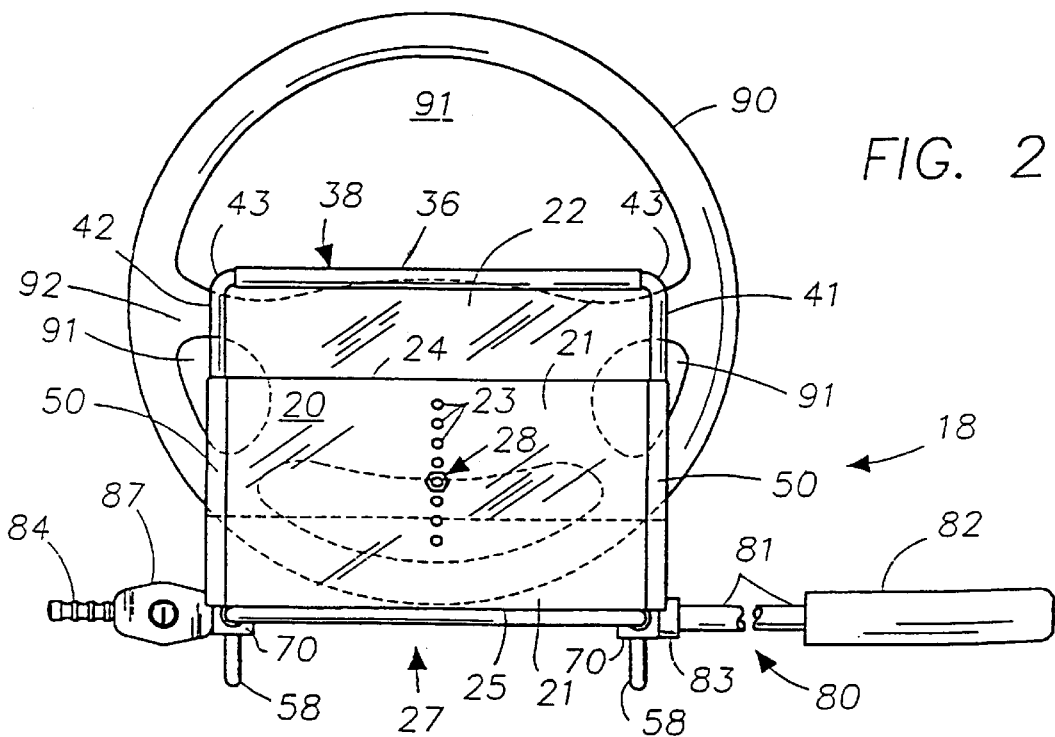
FIG. 2 is a plan view of the device of the invention, mounted to a steering wheel but in a reversed manner from that illustrated in FIG. 1.

Referring now to the drawing wherein reference characters therein correspond to like numerals hereinafter in this description, FIGS. 1–5 illustrate a device 18 that incorporates my invention. Device 18 comprises a shield 20 composed of a pair of panels 21, 22 in sliding engagement with one another when in a closed or locked mode, it being an overlapping relationship one to the other in such modes. The panel 21 includes a series of holes 23, preferably centrally disposed, and which extend between its one edge 24 that is in an overlapped relation to the other panel 22 when they are in a closed or locked mode, and towards its other edge 25 that terminates the device 18 at its one end 27, FIGS. 1, 2. Fastening means 28, FIGS. 1, 2, is provided for the panels 21, 22, and is illustrated, FIGS. 3, 8, as a bolt or screw 31 welded to panel 22, its threaded shank 32 being adapted to insert through any one of the holes 23 in panel 21, with a nut 33, FIG. 3, thereafter being applied thereto to tighten the panels together in fixed engagement. It may be noted that FIG. 3 shows that the panels 21, 22 are displaced from one another, i.e., not engaging one another. However, were they to close upon each other in an overlapping relationship, they would be illustrated in an extreme engaged position relative to one another, as indicated by the axis line 34, FIG. 3, passing through the center of the nut 33 and the one hole 23 immediately adjacent the edge 24 of the panel 21.

A support 36, illustrated as a tube, FIG. 3, is secured, such as by welding, FIGS. 6, 7, to one side or wall of the panel 22 at the device 5 other termination or end 38, FIG. 2. A freely rotatable mount 39, FIG. 5, extends throughout the tube 36. Limbs 41, 42 are mounted at, preferably integrally formed with, portions, or exposed turns 43, of the mount 39 projecting from the tube 36. The limbs 41, 42 of the mount 39 are positioned to extend along the side edges 45, FIG. 3, of panel 21, making for a U-shaped appearance for the mount 39 and the limbs 41, 42. Sleeves 47 are securely mounted along the side edges 45 of panel 21 and into which the limbs 41, 42 slidably fit for reciprocating movement therein. A head 49, FIGS. 3, 5, is mounted, such as by welding a bead or projection thereto, on the end of each of the limbs 41, 42 to prevent their pulling out from their respective sleeves 47 once the panels 21, 22 are assembled to the device 18. The sleeves 47 are securely seated in flanges 50 integrally formed along or in the side edges 45 of panel 21, and accept their respective limbs 41, 42 even though the panels 21, 22 may not be in an engaged relationship with one another. Thus, it is apparent that these limbs 41, 42 provide an ease of assembly for the panels 21, 22 in the assembly of the device, although other elements of the device 18 must yet be operatively connected together.

A second support 51, illustrated again in the form of a tube, is securely attached to the other side or wall of the panel 22, opposing support 36, FIGS. 6, 7, and also is located at end 38 of device 18. A freely rotatable mount 52, FIG. 6, extends throughout the support 51, and includes exposed turns 53 to which corresponding internally threaded collars 54 are fixedly attached, such as by welding. Elbow members 55, 56 are mounted, as by their corresponding threaded arms 57, to their corresponding collars 54, while including legs 58 mounted to their corresponding arms 57. A foot 59 is mounted to and at the end of each leg 58. An alternative foot 59a in the form of a ball is shown in FIG. 9. A nut 60 and its lock washer 61 are mounted upon each arm 57 to tighten down against its corresponding collar 54 at a desired point of threading its arm 57 into its collar 54, and the adjustability of the lengths of one or both arms 57 provides for adjustability in depth for the device 18. Legs 58 are disposed in a direction generally parallel to the limbs 41, 42 when the device 18 is in a closed or locked mode, and in a direction towards the device's end 27.

At the end 27 of the device 18, a rod 62, securely mounted such as by welding, to and across the width of panel 21, provides a Support for links 63, 64, depending from the device at that termination or end 27, or from panel 21. Corresponding exposed turns 65 are integrally mounted to rod 62 and from which links 63, 64 depend. Each link 63, 64 comprises an internally threaded collar 66 secured, such as by welding, to its corresponding turn 65. A threaded peg 67 mounts to its corresponding collar 65. A nut 68 and associated lock washer 69 are mounted on each of the pegs 67 for tightening down at a desired point the peg 67 against its corresponding collar 66. Links 63, 64 extend in a direction generally perpendicular to the plane of the panel 21. Pegs 67 connect their yoke members 70, to which they are respectively preferably attached such as by welding, to corresponding ones of the links 63, 64. Each yoke member 70 includes a cavity 71 that is caused to be disposed in alignment with and to accept or clasp a corresponding one of the legs 58 in the closed or locked mode for device 18. The nuts 68 and their lock washers 69 mounted on their corresponding pegs 67 tighten down against their corresponding collars 66 at a desired point of their threading into their collars 66 and the adjustability of the lengths of one or both pegs 67 provides for adjustability in depth for the device 18.

A locking bar assembly 80, FIG. 5, is employed across the clasping or yoke members 70, and comprises a bar 81 having a handle 82 mounted along its one end, a stop 83 located along its length, and fluted surfaces 84 mounted elsewhere along its length distal from the stop 83. The bar 81 is fed through apertures 85, FIGS. 3, 5, provided in the walls 86 that define the cavities 71 of both yoke members 70 until the stop 83 abuts the one yoke member and the bar's fluted surfaces 84 project through or to the exteriorly disposed side of the other yoke member 70. A lock mechanism 87 is mounted to the fluted surfaces 84, to abut its yoke member, at which then a key 88 is utilized to turn the lock's cylinder to lock mechanism 87 to its particular fluted surface on the bar 81 and by which the device 18 is maintained in a locked mode. It should be understood that the locking bar 81, its fluted surfaces 84, and the lock mechanism 87 are state of the art fixtures.

In operation of the invention, FIG. 4, the open mode for device 18 is shown by the phantom outline of the elbow members 55, 56. The panels 21, 22 of shield 20 are first adjustably fixed to one another by the nut 33 on its threaded shank 32 being applied to a selected hole 23 of panel 21, FIG. 5. Such adjustment is performed and accomplished as the panels 21, 22 are manually mounted atop the central portion of a steering wheel 90 which may or may not contain an airbag assembly (not shown). Such adjustment provides for the desired length, upon the steering wheel 90, of the device 18 between its two terminations or ends 27, 38. The links 63, 64 are thrust through the appropriate or applicable voids 91 separating spokes 92 of the wheel 90, during the mounting of the device 18 to the steering wheel 90. The elbow members 55, 56 then are swung under the steering wheel 90, in the direction of arrow 94, FIG. 4, so that their legs 58 can be inserted into the cavities 71 of their corresponding yoke members 70. The bar 81 then is mounted through the apertures 85 of the yoke members 70, thereby trapping the legs 58 within their cavities 71. Stop 83 seats against its yoke member 70, FIG. 5, and thereafter the lock mechanism 87 is mounted to the other end of the bar 81, and slid up to abutment with the other yoke member 70. Key 88 is activated within the lock cylinder of the lock mechanism 87 to lock the latter to its appropriate fluted surface 84 on the bar 81. The panels 21, 22 now cloak substantially all if not all of the centrality of the steering wheel 90 and an airbag (not shown) where it concealed within the centrality of the steering wheel 90 or within its column 95. Thus, the device 18 is in place and in locked mode on the steering wheel 90. Either feet 59, 59a prevents unwarranted pull-out of the legs 58 from their yoke members 70.

FIG. 1 presents the device 18 in a 180° reversed position from that shown in FIG. 2. However, the steps of application of the device to steering wheel 90 are the generally and substantially the same in either application.

It is apparent that the turning of the wheel 90 can be displaced but a few degrees before either end of the length of the bar 81 strikes a seat cushion or door panel (not shown), and thereby no longer turnable, making operation of the vehicle on a roadway or the like itself impossible.

The above descriptions of the invention's operation assumes that the links 53, 64, and the arms 57 have been adjusted already in their lengths to accommodate the depth of the device 18 on a particular steering wheel and its column. However, for an initial application of the device 18 to a particular steering wheel, for the first time, the nuts 60 and 68 with their respective washers 61, 69 are threaded into a loose mounting on the threaded arm 57 and peg 67, respectively. The arm 57 and peg 67 are rotated until their respective lengths are sufficient or adequate to meet the desired depth for the device 18 on the particular steering wheel in question. It may be necessary to remove the device 18 for rotation of arms 57 and thereafter reapply the device to the steering wheel when such depth has been realized. It may be necessary for a trial and error technique to be followed, i.e., on and off the steering wheel, until the desired depth for the device 18 has been achieved. Once such depth has been achieved, the nuts 60 and 68, with their washers 61, 69, are snugged up against the bottoms of the collars 54 and 66, respectively, to thereby secure the lengths of the arms 57 and links 63, 64, and provide the required or desired depth for the device 18 on the steering wheel. Thereafter, these elements need not be required to be adjusted again, in the application of the device to the same steering wheel and column, as long as the device 18 continues to be used on that particular steering wheel. However, should the configuration of the steering wheel 90 and/or that of its column 95 be changed, then the application of the device 18 may require the same steps for satisfactory application to a different steering wheel 90, beginning with the changing of the length of the device 18 between its ends 27, 38, if necessary.

The locking bar assembly 80 need not be applied until after fixed adjustment of the device 18 to its particular steering wheel, i.e., until the adjusted and fixed lengths and depth of the device, arms and links have been accomplished.

Thus, an anti-theft deterrent has been effected against an unauthorized taking of the vehicle having the device 18 applied to its steering wheel 90, and airbag if included.

The mounts 39, 52 are fabricated and inserted through their respective tubes 36, 51. Their turns 43, 53 then are fabricated, with limbs 41, 42 being positioned as illustrated, relative to their turns 43. The threaded collars 54 are welded to their turns 53. The threaded arms 57, with nuts 60 and lock washers 61 on them, are threaded to their corresponding collars 54. Turns 65 are fabricated on rod 62 that is or is to be welded to panel 21. Threaded collars 66 are welded to their turns 65, and the pegs 67, with their nuts 68 and lock washers 69, are threaded thereto. The limbs 41, 42 are inserted into their corresponding sleeves 47 mounted on the side edges 45 of the panel 21, after which heads 49 are formed in known fashion on the ends of such limbs. The bolt or screw 32 fixed to panel 22 is caused to seek its required or desired hole 23 in the panel 21 and its nut 33 thereafter applied to it to fix the panels 21, 22 together. The legs 58 of the elbow members 55, 56 are caused to be inserted across the cavities 71 of their respective yoke members 70, after which the locking bar 81 is applied through the apertures 85 in the yoke members 70 to lock the arms therein. Lastly, the locking bar assembly 80 is readily applied to the yoke members 70, its stop 83 abutted to one of the members 70, after which the lock mechanism 87 is lock to its fluted surface 84 while abutting the other yoke member 70.

The device 18 is preferably made of hardened or stainless steel. A plastic coating (not shown) may be applied to the device's elements, some or all, as well as a good quality paint to some or all of its elements. A rubber coating, bonded by glue to the metal, also may be applied to various components of device 18.

With the described components formed from metal such as stainless or hard steel, cutting through them would be painstakingly difficult and time-consuming, thus providing a time deterrent accompanying an unauthorized taking. The takers would be quickly witnessed during such attempt of taking, and thence apprehended immediately.

Various changes and modifications may be made in device 18 without varying from the scope and spirit of the invention as expressed in the appended claims hereto. The arms and links may be mounted to supports at their respective terminations of the device other than by the illustrated ones in the drawing. The inventive concept embraces the utilization of the legs 58 in a crossed pattern as well, whereby they are not parallel to limbs 41, 42, in a closed mode, but rather join clasping members in a diagonal pattern in the device, this being a useful assembly where the locking means is not the illustrated assembly 80 but rather two (2) padlocks (not shown) having their elements projecting through the apertures 71 of the yoke members 70. In such an embodiment, the cavities 70 of the yoke members face, in a diagonal fashion across the device, each of the collars 54 in order to receive the corresponding leg 58 therefrom, after which the padlocks are mounted to their respective apertures in the yoke members. Also, the panels 21, 22 need not be squared off or fashioned rectangularly, as illustrated, but may be configured in trapezoidal or other suitable geometrical fashion as well. The collars 54, 66 may be attached to their respective members 57, 67 and the turns 43, 65 threaded, with their corresponding fasteners (nuts and lock washers) mounted accordingly. Also, the inventive concept embraces embodiments that have adjustability alone in either the elbow members or in the links, without adjustability being provided for both of such elements. The adjustability need not be equal for both the links and the elbow members for a given or particular steering wheel or other wheel. Also, the pair of panels can be adjusted to each other's length and thereafter a single hole in one of them may be fashioned to accommodate its bolt and nut, rather than providing at first a series of holes in a panel.

INDUSTRIAL APPLICABILITY

The shield is applicable to as many vehicles having a steering wheel and column therewith, with or without airbags, as are produced; in addition thereto, to roadway tires and any other suitable application as well.

I claim:

1. An anti-theft device adapted for a wheel comprising
   a shield having a first termination and a second termination, panels slidably engageable with one another in said shield and extending between the first termination and the second termination, means adjustable in their lengths for varying the depth to said device mounted to one of said panels at the first termination, clasping means mounted on said varying means, and elbow members mounted to the other of said panels at the second termination, said elbow members retainable by said clasping means on said adjustable varying means thereby providing a closed mode for said device.

2. The anti-theft device of claim 1 including means for locking said elbow members in their clasping means.

3. The anti-theft device of claim 2 including means for assembling said one of said panels to the other of said panels, and means for fastening together in fixed relationship said panels.

4. The anti-theft device of claim 3 wherein said fastening means comprises
  at least one hole in one of said panels,
  a bolt mounted on the other of said panels, and
  a nut threadable to said bolt after its projection through said hole.

5. The anti-theft device of claim 3 wherein said one of said panels includes side edges, said assembling means comprising
  a sleeve mounted on at least one of said side edges and
  a limb having an end and mounted at and extending from said other of said panels and reciprocable in said sleeve.

6. The anti-theft device of claim 5 wherein said limb includes a head on its end to prevent disassembly of said panels.

7. The anti-theft device of claim 3 including means for assembling said other of said panels and elbow members to said one of said panels.

8. The anti-theft device of claim 7 wherein said one of said panels includes side edges, said assembling means comprising
  a sleeve mounted on at least one of said side edges and
  a limb having an end and mounted at and extending from the other of said panels and reciprocable in said sleeve.

9. The anti-theft device of claim 8 including a head formed on the end of said limb.

10. The anti-theft device of claim 8 or claim 9 wherein a flange is mounted on said one of said side edges, said sleeve securely mounted to said flange.

11. The anti-theft device of claim 1 or claim 2 wherein each of said varying means comprises a first threaded collar, a threaded peg mounted to said clasping means for mounting to said first threaded collar, and means for tightening down said threaded peg to its corresponding threaded collar at a desired point of threading said peg into its corresponding first threaded collar, thereby providing variation in the depth for said device by changing the desired point of threading.

12. The anti-theft device of claim 11 wherein said elbow members are adjustable in their lengths for varying the depth to said device.

13. The anti-theft device of claim 12 including means for fastening said panels together.

14. The anti-theft device of claim 13 including means for assembling said one of said panels and elbow members to the other of said panels.

15. The anti-theft device of claim 14 wherein said one of said panels includes side edges, said assembling means comprising
  a sleeve mounted on at least one of said side edges and
  a limb having an end and mounted at and extending from said other of said panels and reciprocable in said sleeve.

16. The anti-theft device of claim 13 wherein said fastening means comprises
  at least one hole in one of said panels,
  a bolt mounted on the other of said panels, and
  a nut threadable to said bolt after its projection through said hole.

17. The anti-theft device of claim 16 wherein more than one hole of said fastening means is formed in said one of said panels to thereby provide additional adjustability of length of said shield.

18. The anti-theft device of claim 1 or claim 2 including means for fastening said panels together.

19. The anti-theft device of claim 18 wherein said fastening means comprises at least one hole in said one of said panels, a bolt mounted on the other of said panels, and a nut threadable to said bolt after its projection through said hole.

20. The anti-theft device of claim 19 wherein more than one hole of said fastening means is formed in said one of said panels to thereby provide additional adjustability of length of said shield.

21. The anti-theft device of claim 20 including means for assembling said other of said panels and elbow members to said one of said panels, varying means and clasping means.

22. The anti-theft device of claim 21 wherein said one of said panels includes side edges, said assembling means comprising
  a sleeve mounted on at least one of said side edges and
  a limb having an end and mounted at and extending from said other of said panels and reciprocable in said sleeve.

23. The anti-theft device of claim 22 including a head formed on the end of said limb.

24. The anti-theft device of claim 23 wherein a flange is mounted on said one of said side edges, said sleeve securely mounted to said flange.

25. The anti-theft device of claim 19 including means for assembling said other of said panels and elbow members to said one of said panels, varying means and clasping means.

26. The anti-theft device of claim 2 wherein said clasping means comprise yoke members having walls forming cavities, with apertures in said walls, said locking means comprising
  a bar with fluted surfaces and projecting through said apertures, and a lock mechanism mounted to said bar for locking to one of its fluted surfaces.

27. The anti-theft device of claim 26 wherein
a stop is mounted on said rod for abutting against one of said yoke members,
said lock mechanism being abutable against the other of said yoke members.

28. The anti-theft device of claim 2 wherein
said locking means comprises at least one padlock secured to said clasping means.

29. An anti-theft device adapted for a wheel comprising
a shield having a first termination and a second termination,
panels slidably engageable with one another in said shield and extending between the first termination and the second termination,
means mounted to one of said panels at the first termination for varying the depth to said device,
clasping means mounted on said varying means, and
elbow members mounted to the other of said panels at the second termination and adjustable in their lengths,
said elbow members being retainable by said clasping means thereby providing a closed mode for said device.

30. The anti-theft device of claim 29 including
means for locking said elbow members in their clasping means.

31. The anti-theft device of claim 29 or claim 30 wherein each one of said elbow members comprises
a leg extendible to said clasping means,
a threaded collar mounted at the second termination of said shield,
a threaded arm to which said leg is mounted and being threadedly mounted to said threaded collar, and
means for tightening down said arm to its corresponding collar at a desired point of threading said arm into its collar, thereby providing adjustability of depth in said device.

32. The anti-theft device of claim 31 wherein
said varying means are adjustable in their lengths.

33. The anti-theft device of claim 32 including
means for fastening said panels together.

34. The anti-theft device of claim 33 wherein
said fastening means comprises
at least one hole in said one of said panels,
a bolt mounted on said other of said panels, and
a nut threaded to said bolt after its projection through said hole.

35. The anti-theft device of claim 34 wherein
more than one hole of said fastening means is formed in said one of said panels to thereby provide additional adjustability of length of said shield.

36. The anti-theft device of claim 29 or claim 30 including
means for fastening said panels together.

37. The anti-theft device of claim 36 wherein
said fastening means comprises
at least one hole in said one of said panels,
a bolt mounted on said other of said panels, and
a nut threaded to said bolt after its projection through said hole.

38. The anti-theft device of claim 37 wherein
more than one hole of said fastening means is formed in said one of said panels to thereby provide additional adjustability of length of said shield.

39. The anti-theft device of claim 38 including
means for assembling said other of said panels and elbow members to said one of said panels, varying means and clasping means.

40. The anti-theft device of claim 39 wherein
said one of said panels includes side edges,
said assembling means comprising
a sleeve mounted on at least one of said side edges and
a limb having an end and mounted at and extending from the other of said panels and reciprocable in said sleeve.

41. The anti-theft device of claim 40 including
a head formed on the end of said limb to prevent disassembly of said panels.

42. The anti-theft device of claim 41 wherein
a flange is mounted on said one of said side edges,
said sleeve securely mounted to said flange.

43. The anti-theft device of claim 40 wherein
a flange is mounted on said one of said side edges,
said sleeve securely mounted to said flange.

44. The anti-theft device of claim 30 wherein
said clasping members comprise yoke members having walls forming cavities, with apertures in said walls,
said locking means comprising
a bar with fluted surfaces and projecting through said apertures, and
a lock mechanism mounted to said bar for locking to one of its fluted surfaces.

45. An anti-theft device of claim 44 wherein
a stop is mounted on said rod for abutting against one of said yoke members,
said lock mechanism being abutable against the other of said yoke members.

46. The anti-theft device of claim 29 wherein
said varying means are adjustable in their lengths.

47. The anti-theft device of claim 30 wherein
said varying means are adjustable in their lengths.

48. The anti-theft device of claim 46 or claim 47 or including
means for assembling said other of said panels and elbow members to said one of said panels.

49. The anti-theft device of claim 48 wherein
said one of said panels includes side edges,
said assembling means comprising
a sleeve mounted on at least one of said side edges and
a limb having an end and mounted at and extending from the of said panels and reciprocable in said sleeve.

50. The anti-theft device of claim 49 wherein
a flange is mounted on said one of said side edges,
said sleeve securely mounted to said flange.

51. The anti-theft device of claim 49 including
a head formed on the end of said limb.

52. The anti-theft device of claim 30 wherein said locking means comprises
at least one padlock secured to said clasping means.

53. An anti-theft device adapted for a wheel comprising
a shield having a first termination and a second termination,
slidably engageable panels in said shield and extending between its first termination and its second termination,
means adjustable in their lengths for varying the depth to said device mounted to one of said panels at the first termination, clasping means mounted on said varying means, and adjustable elbow members providing variable depth to said device and mounted to the other of said panels at the second termination, said elbow members being retainable by said clasping means thereby providing a closed mode for said device.

54. The anti-theft device of claim 53 including means for fastening together in fixed relationship said slidably engageable panels.

55. The anti-theft device of claim 53 or claim 54 including means for locking said elbow members in their clasping means.

56. The anti-theft device of claim 55 wherein said locking means comprises at least one padlock.

57. The anti-theft device of claim 55 including means for assembling said second one of said pair of panels to a first one of said panels.

58. The anti-theft device of claim 53 or claim 54 including means for assembling said one of said panels to the other of said panels.

59. The anti-theft device of claim 54 including means for locking said elbow members in their clasping means and means for assembling said one of said panels to a first one of said panels, wherein said fastening means comprises
    at least one hole in said one of said panels,
    a bolt mounted on said other of said panels, and
    a nut threaded to said bolt after its projection through said hole.

60. The anti-theft device of claim 59 wherein more than one hole of said fastening means is formed in said one of said panels to thereby provide additional adjustability of length of said shield.

\* \* \* \* \*